United States Patent
Herslow

(10) Patent No.: US 10,311,346 B2
(45) Date of Patent: Jun. 4, 2019

(54) DURABLE CARD

(71) Applicant: COMPOSECURE, LLC, Somerset, NJ (US)

(72) Inventor: John Herslow, Scotch Plains, NJ (US)

(73) Assignee: CompoSecure, LLC, Somerset, NJ (US)

(*) Notice: Subject to any disclaimer, the term of this patent is extended or adjusted under 35 U.S.C. 154(b) by 54 days.

(21) Appl. No.: 14/178,436

(22) Filed: Feb. 12, 2014

(65) Prior Publication Data

US 2014/0224881 A1  Aug. 14, 2014

Related U.S. Application Data

(60) Provisional application No. 61/763,948, filed on Feb. 13, 2013.

(51) Int. Cl.
  G06K 19/077 (2006.01)
  G06K 19/02 (2006.01)
  (Continued)

(52) U.S. Cl.
  CPC ............ *G06K 19/02* (2013.01); *B32B 37/003* (2013.01); *B32B 37/025* (2013.01);
  (Continued)

(58) Field of Classification Search
  CPC .................... G06K 19/02; G06K 19/07722
  See application file for complete search history.

(56) References Cited

U.S. PATENT DOCUMENTS 4,202,811 A * 5/1980 Michael .............. C08G 59/685
                                                             523/435
4,354,851 A   10/1982 Hix et al.
(Continued)

FOREIGN PATENT DOCUMENTS

EP  0368570 A2  5/1990
GB  2111910 A   7/1983
(Continued)

OTHER PUBLICATIONS

Machine translation of KR 20040111317, Korean Patent Office, retrieved Nov. 24, 2017.*
(Continued)

*Primary Examiner* — Suezu Ellis
(74) *Attorney, Agent, or Firm* — RatnerPrestia

(57) ABSTRACT

Cards embodying the invention include a core subassembly whose elements define the functionality of the card and a hard coat subassembly attached to the top and/or bottom sides of the core subassembly to protect the core subassembly from wear and tear and being scratched. The core subassembly may be formed solely of plastic layers or of different combinations of plastic and metal layers and may include all the elements of a smart card enabling contactless RF communication and/or direct contact communication. The hard coat subassembly includes a hard coat layer, which typically includes nanoparticles, and a buffer or primer layer formed so as to be attached between the hard coat layer and the core subassembly for enabling the lasering of the core subassembly without negatively impacting the hard coat layer and/or for imparting color to the card.

5 Claims, 18 Drawing Sheets

(51) Int. Cl.
   *B32B 37/00* (2006.01)
   *B32B 37/18* (2006.01)
   *G06K 17/00* (2006.01)

(52) U.S. Cl.
   CPC ..... *G06K 19/022* (2013.01); *G06K 19/07716* (2013.01); *G06K 19/07722* (2013.01); *B32B 37/182* (2013.01); *B32B 2307/554* (2013.01); *B32B 2425/00* (2013.01); *G06K 19/07794* (2013.01); *G06K 2017/0041* (2013.01)

(56) References Cited

U.S. PATENT DOCUMENTS

| | | | |
|---|---|---|---|
| 4,579,754 A * | 4/1986 | Maurer | B44B 7/002 428/29 |
| 4,856,857 A | 8/1989 | Takeuchi et al. | |
| 5,292,616 A * | 3/1994 | Fujita | G11B 7/0033 346/135.1 |
| 5,316,791 A * | 5/1994 | Farber | B05D 7/544 427/164 |
| 5,492,370 A | 2/1996 | Chatwin et al. | |
| 5,895,909 A | 4/1999 | Yoshida | |
| 6,066,437 A | 5/2000 | Kosslinger | |
| 6,198,155 B1 | 3/2001 | Verhaegh et al. | |
| 6,644,552 B1 | 11/2003 | Herslow | |
| 6,857,569 B1 | 2/2005 | Smith, Sr. et al. | |
| 7,287,704 B2 | 10/2007 | Herslow | |
| 8,672,232 B2 | 3/2014 | Herslow | |
| 8,725,589 B1 | 5/2014 | Skelding et al. | |
| 8,944,810 B2 | 2/2015 | Herslow | |
| 9,016,591 B2 | 4/2015 | Herslow et al. | |
| 9,390,363 B1 | 7/2016 | Herslow et al. | |
| 9,390,366 B1 | 7/2016 | Herslow et al. | |
| 9,422,435 B2 * | 8/2016 | Posey | C09D 7/1216 |
| 9,542,635 B2 | 1/2017 | Herslow | |
| 9,569,718 B2 | 2/2017 | Herslow | |
| 2002/0014297 A1 * | 2/2002 | Mott | B32B 5/20 156/78 |
| 2002/0015897 A1 | 2/2002 | Toshine et al. | |
| 2003/0107709 A1 | 6/2003 | Rodick | |
| 2003/0234286 A1 | 12/2003 | Labrec et al. | |
| 2004/0217178 A1 | 11/2004 | Lasch et al. | |
| 2005/0189066 A1 | 9/2005 | Look et al. | |
| 2005/0252604 A1 | 11/2005 | Smulson | |
| 2006/0172136 A1 * | 8/2006 | Komori | B05D 7/53 428/412 |
| 2006/0292946 A1 | 12/2006 | Kiekhaefer | |
| 2007/0089831 A1 * | 4/2007 | Florentino | B32B 3/30 156/272.4 |
| 2008/0152797 A1 | 6/2008 | Biondi et al. | |
| 2008/0213551 A1 | 9/2008 | Funicelli et al. | |
| 2009/0169776 A1 * | 7/2009 | Herslow | B32B 37/12 428/29 |
| 2009/0294543 A1 | 12/2009 | Varga et al. | |
| 2009/0315316 A1 | 12/2009 | Staub et al. | |
| 2010/0116891 A1 | 5/2010 | Yano et al. | |
| 2010/0230154 A1 | 9/2010 | Naito et al. | |
| 2011/0020606 A1 | 1/2011 | Herslow et al. | |
| 2012/0328875 A1 * | 12/2012 | Schoneveld | B82Y 30/00 428/339 |
| 2015/0136856 A1 | 5/2015 | Herslow et al. | |
| 2015/0180229 A1 * | 6/2015 | Herslow | G06K 19/07749 361/56 |
| 2015/0206047 A1 | 7/2015 | Herslow et al. | |
| 2015/0339564 A1 | 11/2015 | Herslow et al. | |
| 2016/0180212 A1 | 6/2016 | Herslow et al. | |

FOREIGN PATENT DOCUMENTS

| | | | |
|---|---|---|---|
| JP | 2002260290 A | | 9/2002 |
| KR | 20040111317 A | * | 12/2004 |
| WO | 2004063977 A2 | | 7/2004 |
| WO | 2012002992 A1 | | 1/2012 |
| WO | 2016073473 A1 | | 5/2016 |

OTHER PUBLICATIONS

Extended European Search Report for European Application No. 14752098.5, dated Feb. 3, 2017, 8 pages.
Communication Pursuant to Rules 70(2) and 70a(2)EPC for European Application No. 14752098.5, dated Feb. 21, 2017, 1 page.
International Search Report and Written Opinion of the International Searching Authority for International Application No. PCT/US2014/15939, dated Aug. 25, 2014, 10 pages.
Final Office Action for U.S. Appl. No. 14/183,868, dated Mar. 9, 2018, 29 pages.
Non Final Office Action for U.S. Appl. No. 15/356,586, dated Apr. 2, 2018, 34 pages.
Notice of Allowance for U.S. Appl. No. 14/977,553, dated Oct. 20, 2017, 13 pages.
European Communication for EP Application No. 14752098.5, dated Jan. 16, 2018, 3 pages.
Extended European Search Report for European Application No. 18157273.6, dated Jun. 14, 2018, 6 pages.
Final Office Action for U.S. Appl. No. 15/356,586, dated Sep. 13, 2018, 22 pages.
Non Final Office Action for U.S. Appl. No. 14/183,868, dated Sep. 27, 2018, 16 pages.
Non Final Office Action for U.S. Appl. No. 15/637,092, dated Nov. 1, 2018, 48 pages.
Non Final Office Action for U.S. Appl. No. 15/355,018, dated Oct. 29, 2016, 30 pages.
Non Final Office Action for U.S. Appl. No. 12/460,829, dated Nov. 13, 2018, 13 pages.

* cited by examiner

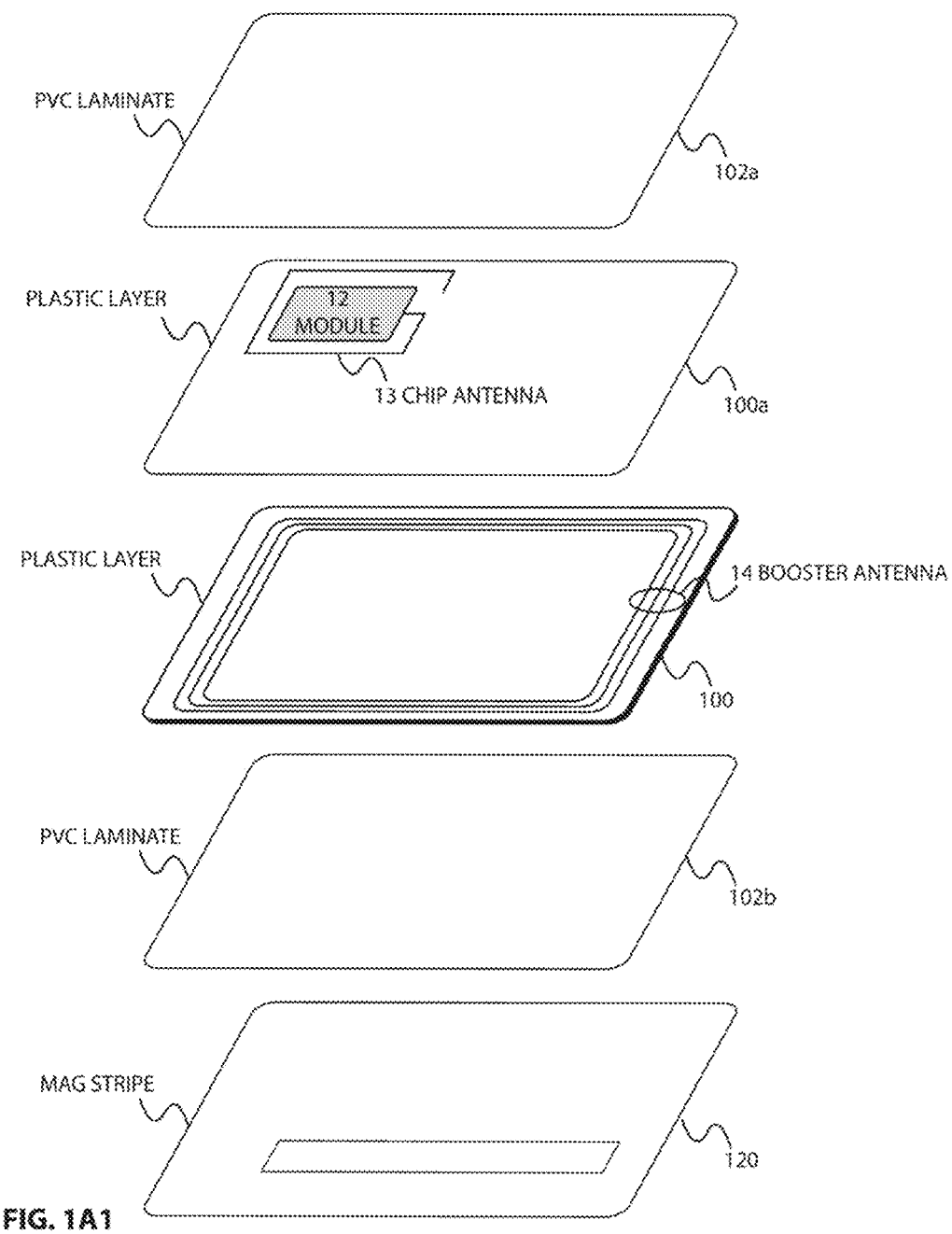
FIG. 1A1

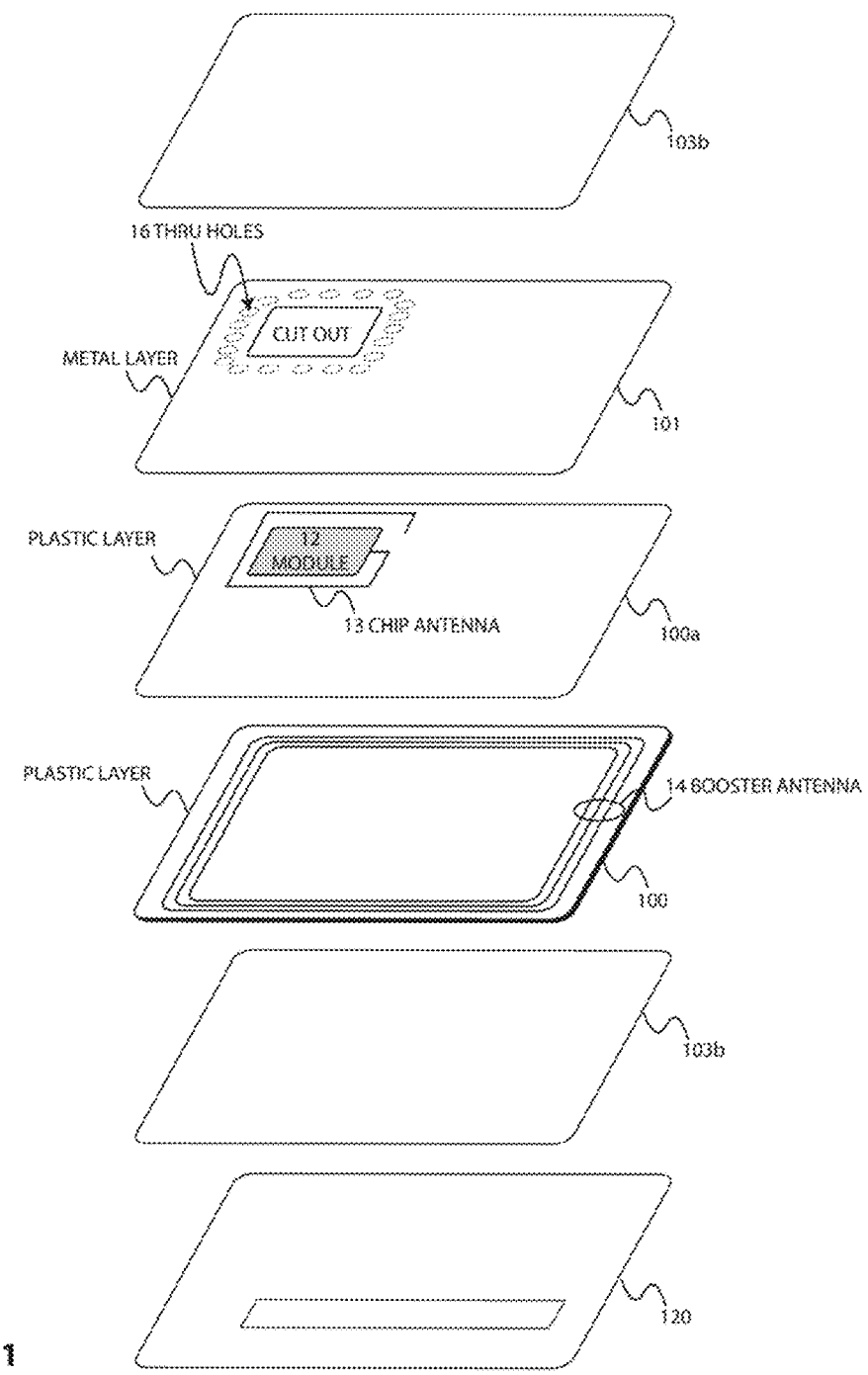
FIG. 4A1

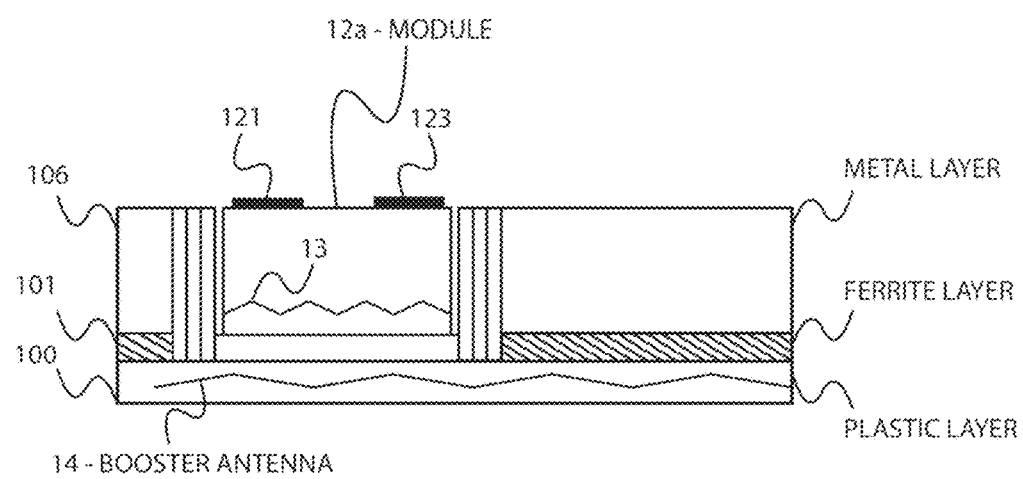
FIG. 4A2

US 10,311,346 B2

DURABLE CARD

This application claims priority based on a provisional application titled Durable Card bearing Ser. No. 61/763,948 filed Feb. 13, 2013 whose teachings are incorporated herein by reference.

BACKGROUND OF THE INVENTION

This invention relates to cards, such as credit cards, plastic cards for ID, financial transactions and other uses, having improved durability and appearance and to apparatus and methods for making such cards. Included in the manufacture is the application of a clear laminate during the manufacture of the cards.

The use of plastic credit cards is widespread. A problem with known plastic cards is that they warp and wear out from repeated use (e.g., within 3-5 years and after 4000 uses—swipes of the magnetic stripe) and the markings become faint or scratched. It has therefore been an aim of the industry to make cards which are sturdier and whose markings, do not fade with repeated use. That is, it is desirable to have plastic cards that can last many (e.g., 5-10) years and which can be subjected to a very large number (e.g., 10,000) of uses; especially magnetic stripe use.

In the past, attempts were made to make the credit card surface harder. For example, cards were made with an ultra violet cured coating. However, all such harder cards were prone to develop cracks due to stress over time. This made these cards undesirable for their intended use.

It is therefore desirable to manufacture a hardy, scratch resistant plastic card which is not prone to develop cracks and to make such cards easy and economical to manufacture.

It is also desirable to manufacture a metal card which is scratch resistant and is also more durable.

SUMMARY OF THE INVENTION

Cards embodying the invention include a hard coat layer formed on top and/or on the bottom of the card. The hard coat layer may be formed of nano-particles, such as silicate nanoparticles, zinc oxide nanoparticles, silicon dioxide crystalline nano-particles, or any other suitable nano-particles with a suitable carrier such as a solvent of water based acrylates, vinyls, urethane or the like. The hard coat can be applied by coating techniques such as gravure, reverse roll, direct roll, or slot coating.

The hard coat layer may be applied to a card, or to a subassembly used in forming a card, by means of a special carrier layer. The special carrier enables a release layer and a hard coat layer to be attached to the special carrier layer to form a subassembly which can then be attached and transferred to another subassembly to form an intermediate assembly from which the carrier and release layers can be removed, leaving the hard coat layer as the top and/or bottom layer of the card.

Cards embodying the invention include a core subassembly whose elements define the functionality of the card and a hard coat subassembly attached to the top and/or bottom sides of the core subassembly. The core subassembly may be formed solely of plastic layers or of different combinations of plastic and metal layers or essentially purely metal layers. The core subassembly may also include:

(a) a semiconductor chip containing selected electronic circuits and an antenna coupled to the chip for enabling contactless radio frequency (RF) communication with an external reading device; and/or (b) a semiconductor chip with contacts to an external surface of the card to enable direct "contact" communication with an external reading device.

Cards embodying the invention include an energy absorbing buffer layer formed between a hard coat layer and a layer intended to be treated (e.g., personalized) with a laser.

BRIEF DESCRIPTION OF THE DRAWINGS

In the accompanying drawings, which are not drawn to scale, like reference characters denote like components.

FIG. 1A1 is an isometric diagram of a core, contactless, plastic card subassembly showing various layers of the subassembly including a layer carrying a chip and one carrying an antenna;

FIG. 1A2 is a highly simplified cross sectional diagram of a "core contact" plastic card sub assembly (subassembly A) which may be used in practicing the invention;

FIG. 2 is a highly simplified cross sectional diagram of a core plastic card sub assembly (subassembly A) combined with hard coat subassemblies located on the top and bottom sides of the card;

FIG. 3A is a highly simplified cross sectional diagram of prior a platens used in the manufacture of cards;

FIG. 4A1 is an isometric diagram of a core, contactless, metal-plastic card subassembly showing various layers of the subassembly including a layer carrying a semiconductor chip and one carrying an antenna;

FIG. 4A2 is a cross sectional diagram of part of a core metal-plastic card subassembly which includes a module and antennas so the subassembly can be used to form a contact card and/or a contactless card;

DETAILED DESCRIPTION OF THE INVENTION

Figure 1A:
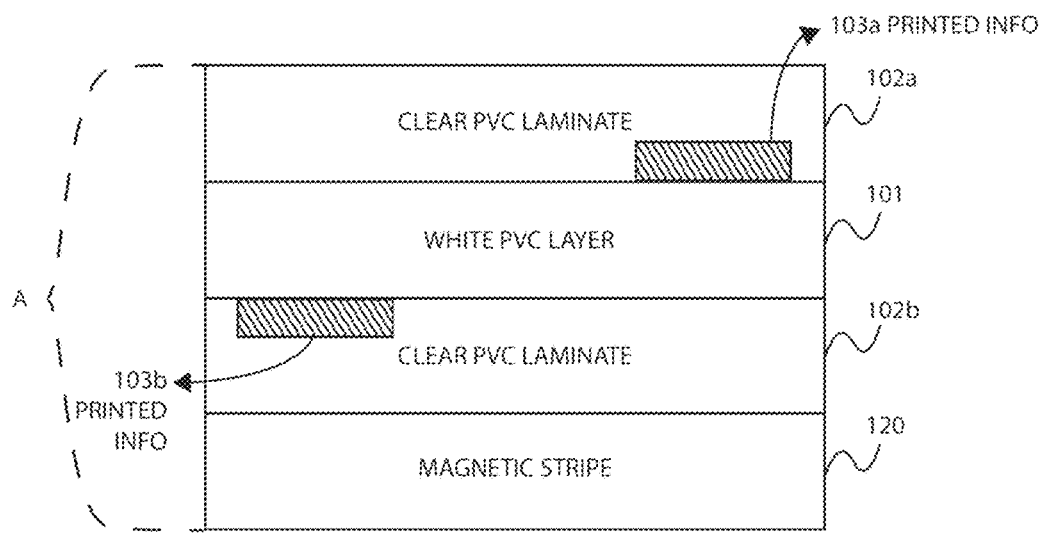
FIG. 1A is a highly simplified cross sectional diagram of a "core" plastic card sub assembly (subassembly A) which may be used in practicing the invention.
Figure 2:
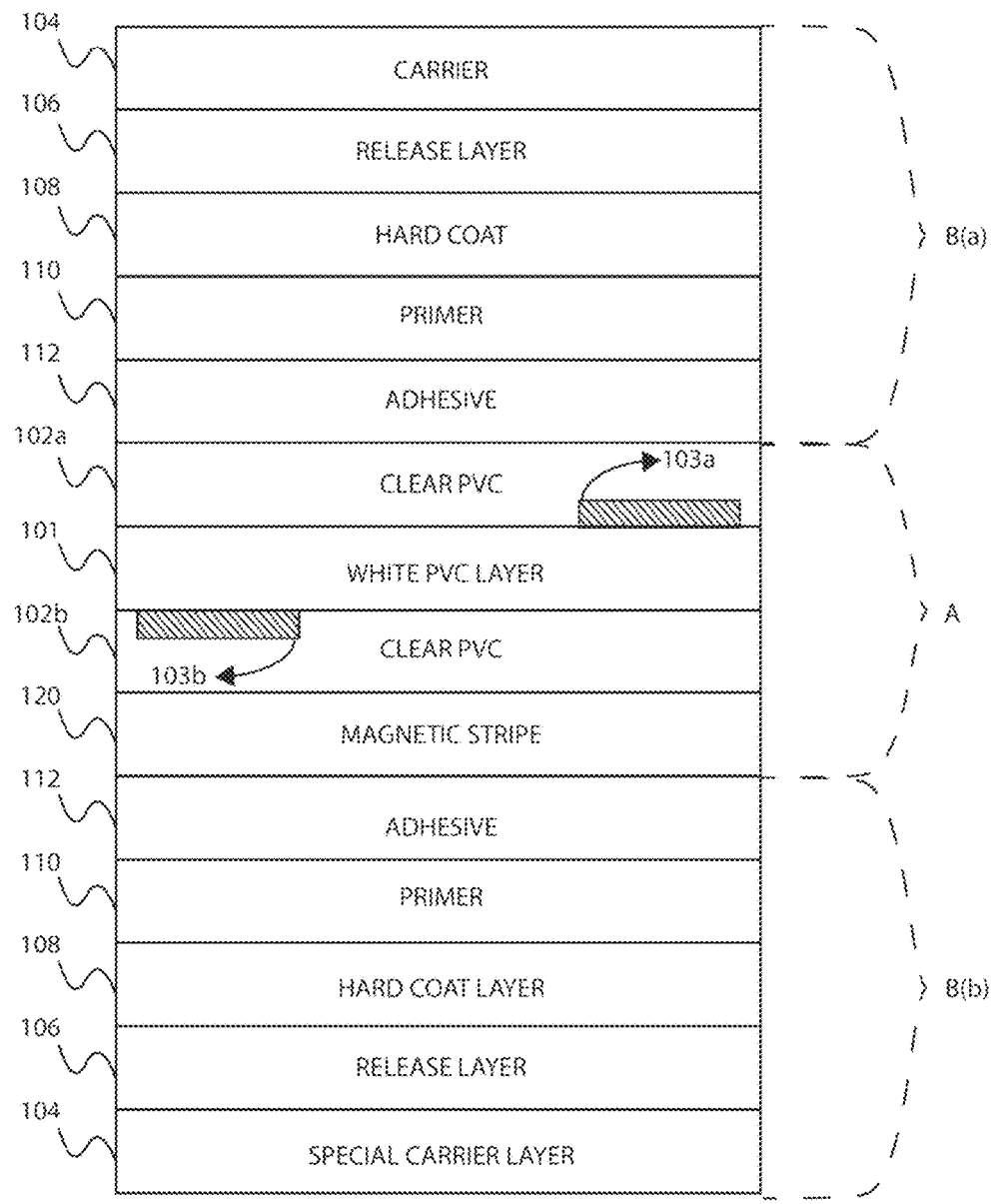
Figure 4A:
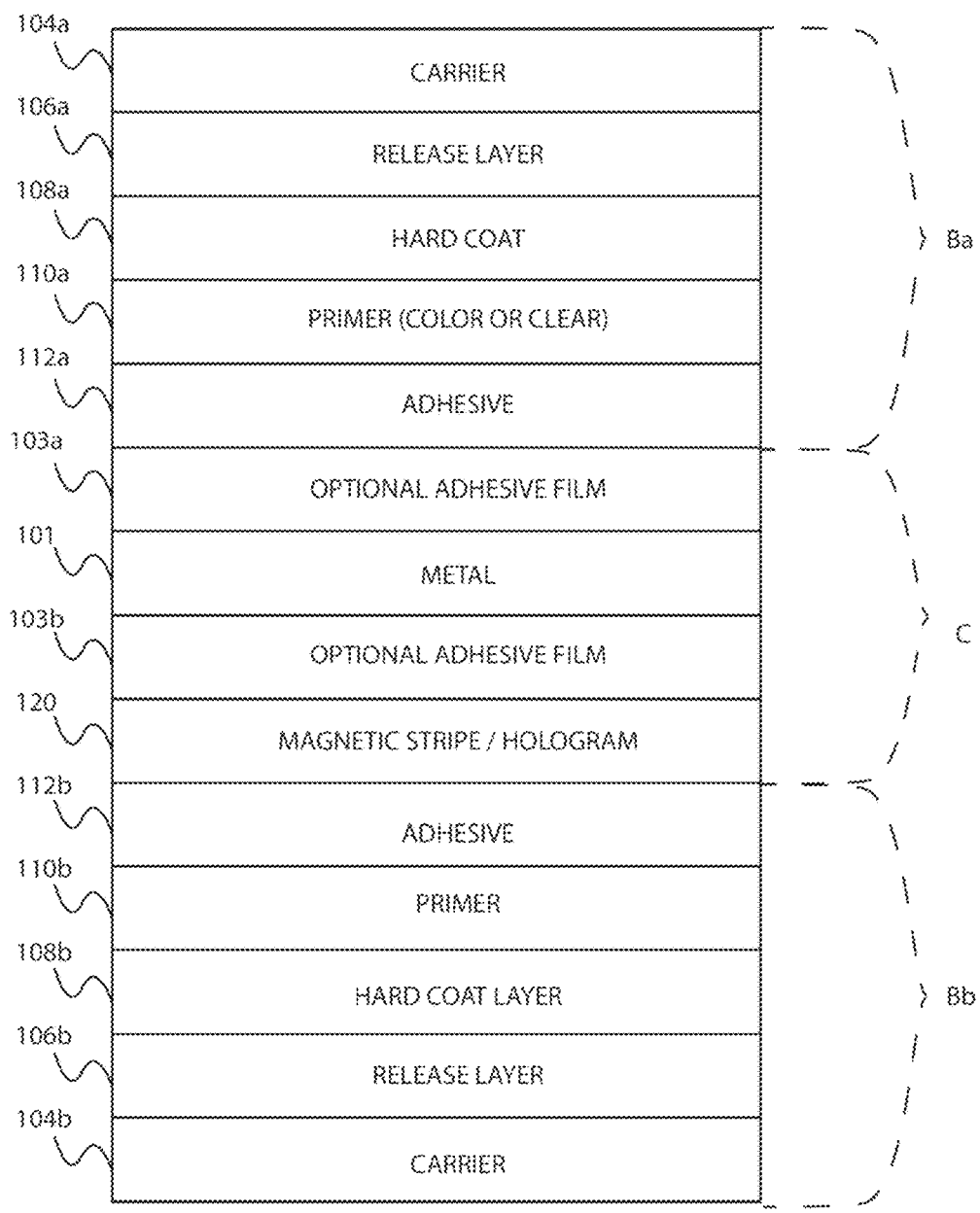
FIG. 4A is a highly simplified cross sectional diagram of a metal card assembly for manufacturing a durable metal card in accordance with the invention.

As shown in the various figures, cards embodying the invention include a "core" subassembly (subassembly A or A1, C, D, E, or F, or a subassembly as shown in FIGS. 1A2 and 4A2) which defines the functionality of the card to which is attached a hard coat subassembly (subassembly B); where the hard coat subassembly can be attached to the bottom and top sides of the core subassembly or to only one side of the core subassembly.

Figure 4B:
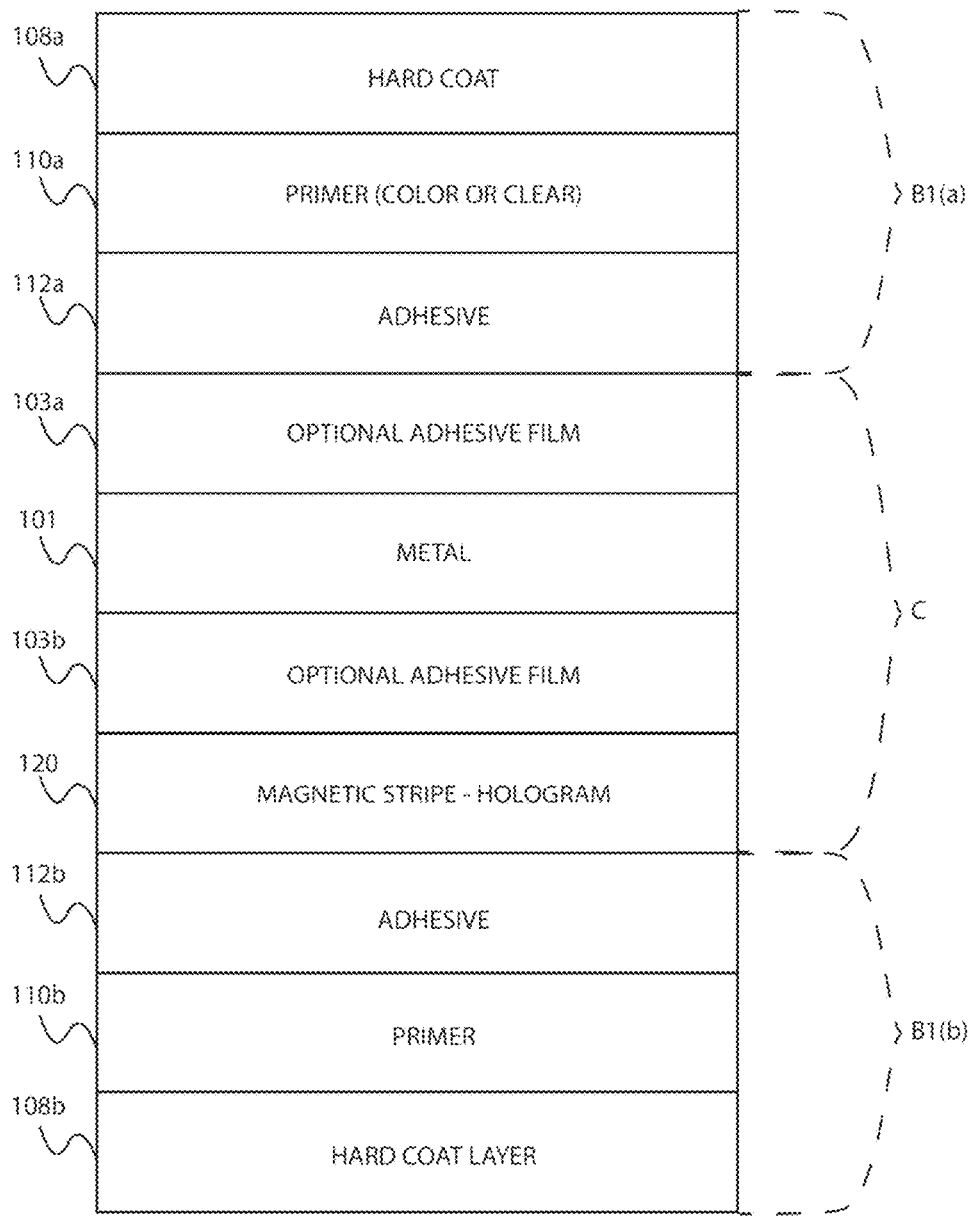
FIG. 4B is a highly simplified cross sectional diagram of a resultant durable metal card formed with a hard coat layer on the top and bottom sides of the card in accordance with the invention.

The "core" subassembly may comprise: (a) a number of plastic layers attached together as shown in FIG. 1A; or (b) a number of plastic layers with a chip and antennas (a contactless "smart" card) carried on one or more of the layers as shown in FIG. 1A1; or (c) a number of plastic layers with a chip and antennas and a contact (a contact or contactless "smart" card) as shown in FIG. 1A2; or (d) a number of metal-plastic layers, forming a hybrid card, as shown in FIGS. 4A and 4B; or (e) a number of metal-plastic layers, forming a hybrid card, with a chip and antennas formed on or within some of the plastic layers (a contactless "smart" card) as shown in FIG. 4A1; or (f)) a number of metal-plastic layers, forming a hybrid card, with a chip and antennas formed on, within, some of the plastic layers and with contacts extending to a surface of the card as shown in FIG. 4A2; or (g) a number of metal-plastic layers, as shown as subassembly D in FIGS. 5A, 5B, as subassembly E in FIG. 6A, and subassembly F in FIG. 6B. The core subassembly could also be formed of a relatively thick metal layer.

Figure 7:
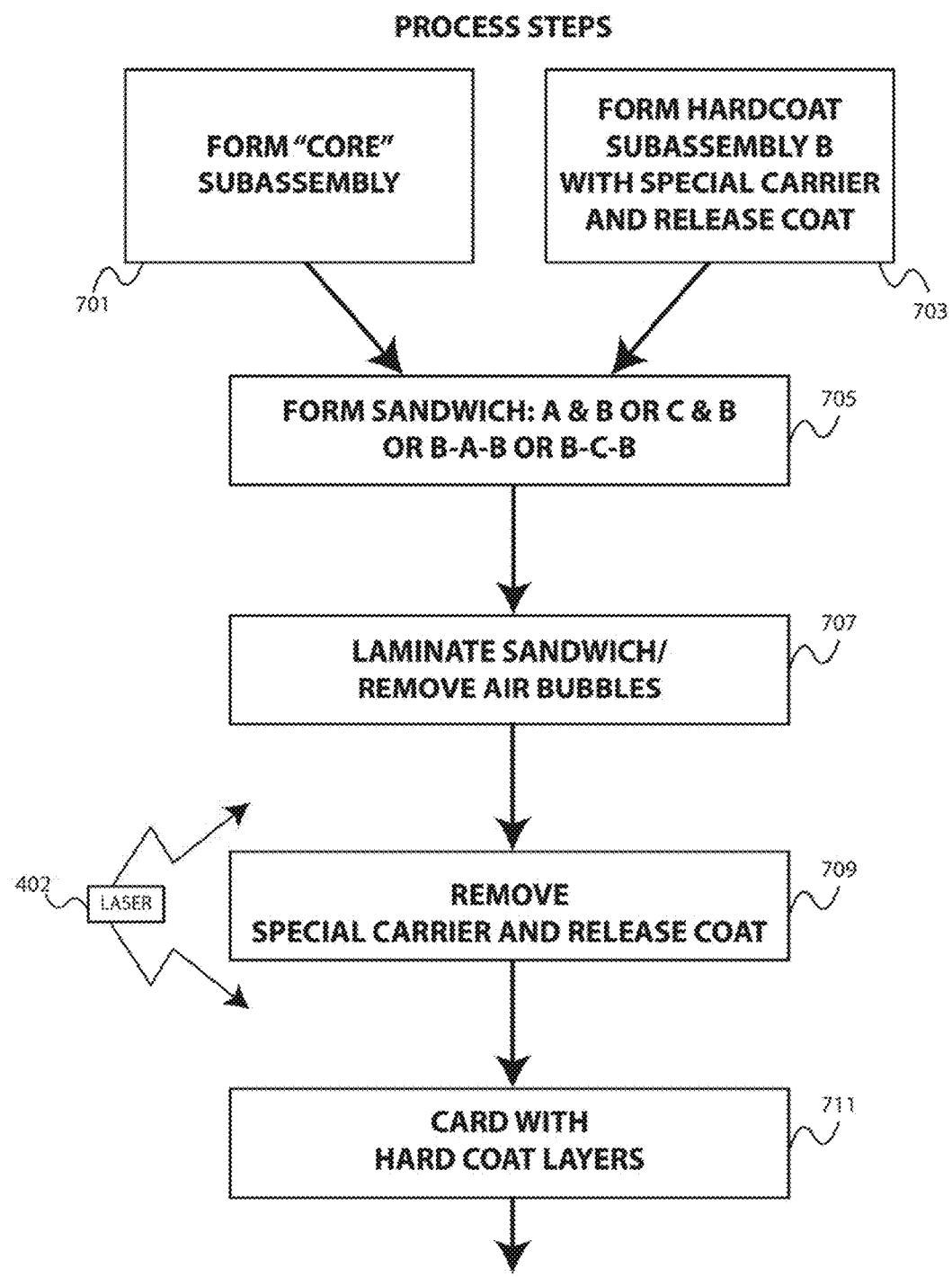
FIG. 7 is a flow chart diagram showing various processing steps in forming cards embodying the invention.

An overview of the general processing steps performed in the manufacture of cards embodying the invention is shown in FIG. 7. As indicated in step 701 of FIG. 7, forming a "core" subassembly is one step in the process of making cards in accordance with the invention. As indicated in step 703 of FIG. 7, another step in the process is forming a hard coat subassembly B having a structure of the type shown in FIG. 1B.

Figure 1B:
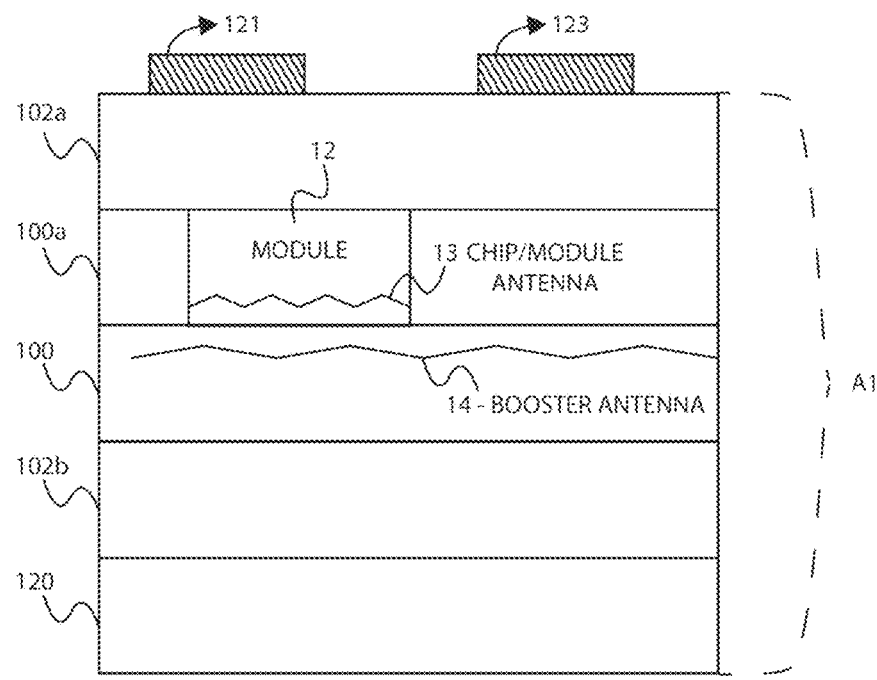
FIG. 1B is a highly simplified cross sectional diagram of a hard coat layer sub assembly (subassembly B) intended to be combined with assorted core subassemblies to form durable cards embodying the invention.
Figure 1B:
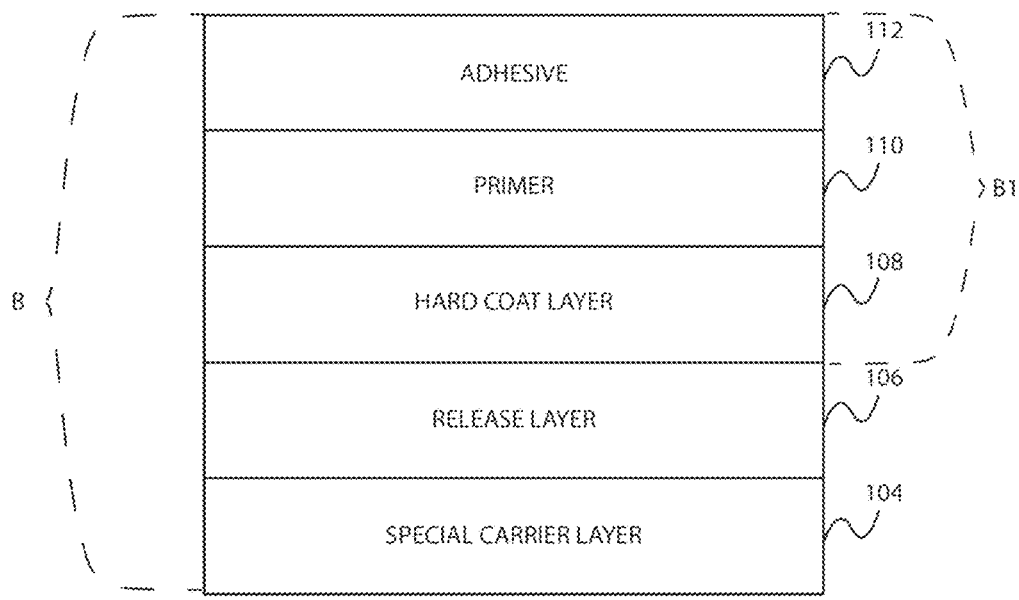
Figure 1C:
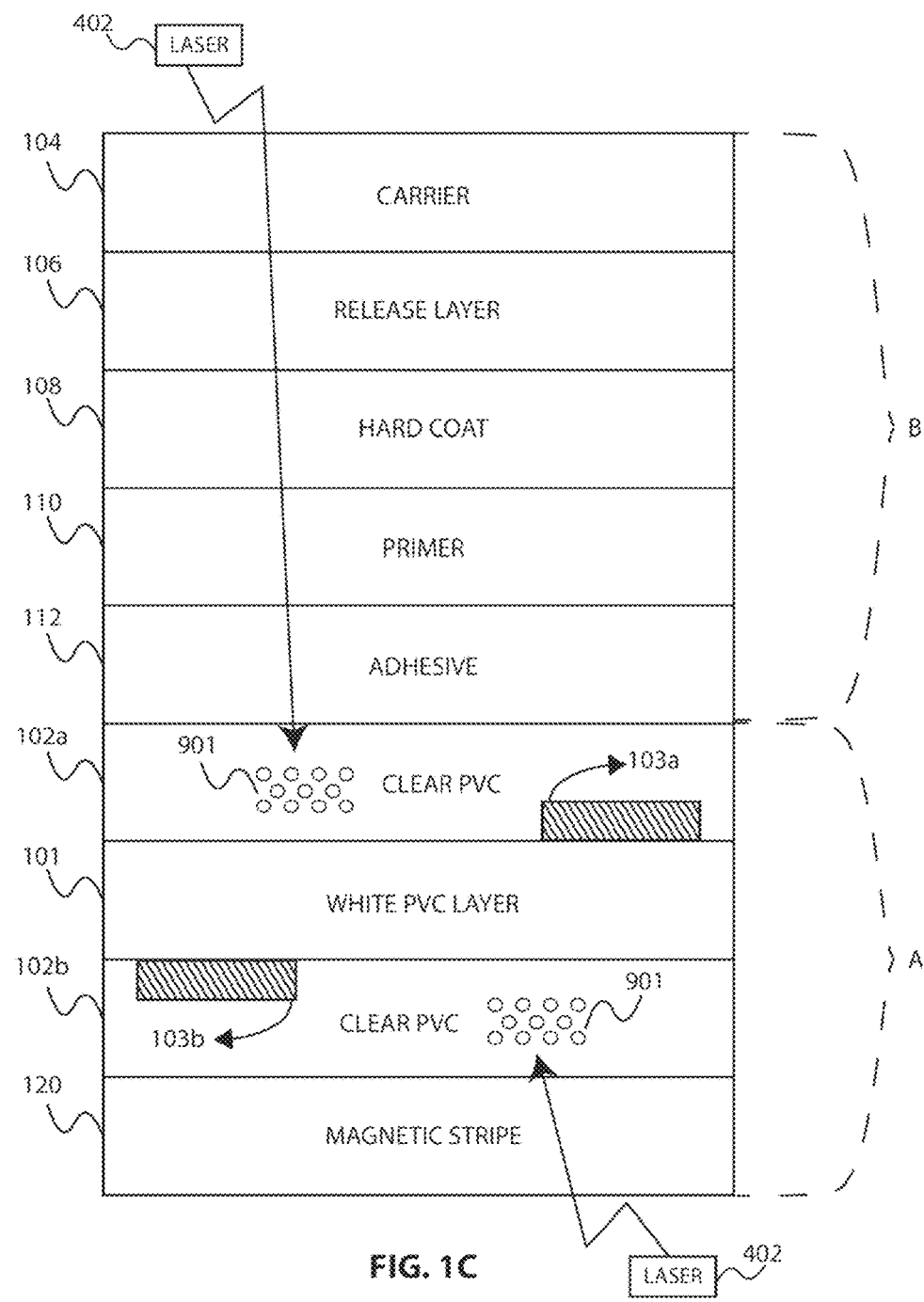
FIG. 1C is a highly simplified cross sectional diagram of a core plastic card sub assembly (subassembly A) combined with a hard coat layer sub assembly (subassembly B) in accordance with the invention.
Figure 1D:
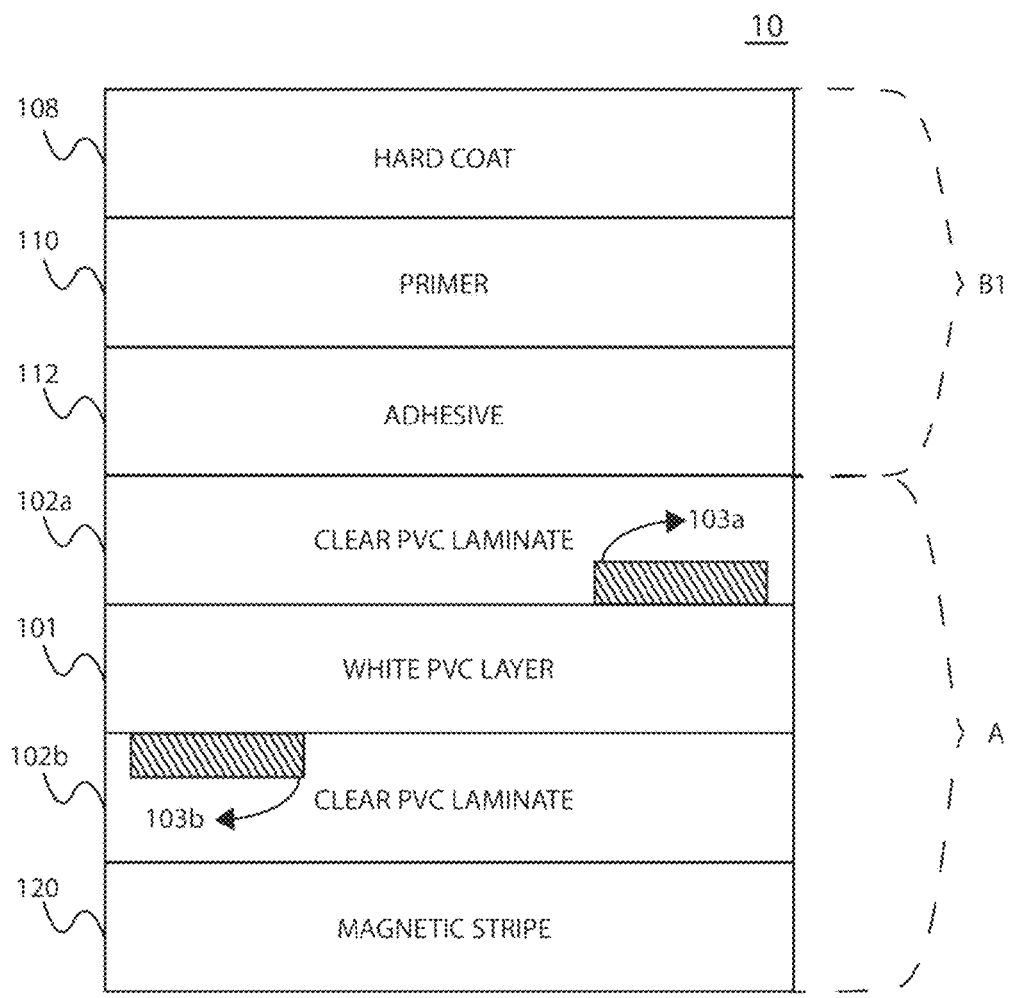
FIG. 1D is a highly simplified cross sectional diagram of a resultant durable plastic card with a hard coat layer in accordance with the invention.

The next step as shown in step 705 of FIG. 7, is forming a "sandwich" comprising the step of attaching, a hard coat subassembly to the top and bottom sides of a core subassembly (as shown, for example, in FIG. 2) or to only one side of the core subassembly (as shown, for example, in FIG. 1C).

The next step as shown in step 707 of FIG. 7 is to laminate the sandwich to form a reliable and firm card. Of significance in the manufacture of cards embodying the invention is the use of a silicone rubber plate designed to ensure that air bubbles are removed.

The next step shown in step 709 of FIG. 7 is the removal of the special carrier and release layer leaving the exposed hard coat layer(s). After the removal of the carrier and release layers a resultant card is produced as per step 711.

Also of significance in the manufacture of cards embodying the invention is a lasering step to personalize/write on a metal core layer or on a PVC core layer of the card. The lasering step can be selectively performed at any of several points during the process of making the cards (e.g., after step 741, or 745 or 707 or 709 or 711).

Some of the detailed steps in the manufacture of a durable card as shown in FIGS. 1A, 1B, 1C and 1D include the following:

1—As shown in FIG. 1A, information (103a, 103b) may be printed in, or on, a core polyvinyl chloride (PVC) layer 101. A clear plastic layer 102a positioned above layer 101 and another clear plastic layer 102b positioned below layer 101 are laminated together with layer 101 using standard processing equipment. A magnetic stripe layer 120 may be laminated with layers 101, 102a and 102b at the same time or subsequently thereto. The laminated assembly of layers 102a, 101, 102b and 120 is identified as subassembly A, which represents a core subassembly suitable for practicing the invention.

2—As shown in FIG. 1A1 subassembly A may be modified to include a layer 100 carrying a booster antenna 14 and a layer 100a carrying a chip module 12 and a chip antenna 13. Layers 100 and 100a may be two separate layers or there may be one plastic layer carrying the chip module and the antennas. The chip module, also referred to as a semiconductor chip or an integrated circuit (IC) includes electronic circuitry which is connected to antenna 13 inductively coupled to antenna 14 to enable the module 12 to communicate via contactless radio frequency (RF) with an external card reading device (not shown). For ease of reference a subassembly A modified to include a chip and antennas) may be identified as a subassembly A1, which represents another "core" subassembly suitable for practicing the invention.

3—Note that, as shown in FIG. 1A2, the subassembly A may also be modified to include contacts extending from the module 12 to contact points 121, 123 along an external surface of a card. These contacts (121, 123) enable an external card reader (not shown) to directly contact and interact with the chip module 12. The modified subassembly also represents another core subassembly suitable for practicing the invention.

4—As shown in FIGS. 1B and 1C, a hard coat subassembly B is formed to be combined with a core subassembly (A or A1) to form a durable card embodying the invention. Subassembly B is referred to herein as a hard coat subassembly. As shown in FIG. 1B, subassembly B includes a special carrier layer 104 on which is positioned a release layer 106 on which is formed a hard coat layer 108 on which is formed a primer layer 110 to which is attached an adhesive layer 112. The layers forming subassembly B can come in rolls or sheets (films) which are stacked on top of each other in the prescribed order and then processed (combined) in the following manner. Heat and pressure are applied to the layers forming subassembly B fusing the stack of sheets (or rolls) together. The entire lamination process may occur in one or two steps depending on the equipment available. That is subassemblies A and B may be laminated separately and then combined. Alternatively, all the layers of subassemblies A and B can be stacked together as shown in FIGS. 1C and 2 and then laminated at the same time.

5—The layers of subassembly B have significant properties, as discussed below:

a—special carrier layer 104, the carrier material is typically polyester, and is typically 0.00075 inches thick. The carrier layer is formed so that a release layer and a hard coat layer (also primer and adhesive) can be formed thereon and such that the carrier and release layer can be removed, leaving the hard coat layer (108*a*, 108*b*) as the top (or bottom) layer of the card. The carrier layer 104 is important due to being specially designed to be compatible with the lamination process and to impart a special finish to the hard coat on the card.

b—The release layer 106 material is, by way of example, polyethylene wax and is approximately 0.00025 inches thick.

c—hard coat layer 108—The hard coat layer may be formed of nano-particles, such as silicate nanoparticles, zinc oxide nanoparticles, silicon dioxide crystalline nanoparticles, or any other suitable nanoparticles with a suitable carrier such as a solvent of water based acrylates, vinyls, urethane or the like. The hard coat can be applied by coating techniques such as gravure, reverse roll, direct roll, or slot coating. This avoids the size limitation of the vapor depositing equipment. The hard coat layer (108*a*, 108*b*) is scratch resistant and provides a very strong and long lasting surface. Bending and abrasion testing has shown that a plastic card with nano particle coating is superior to any of the e-coat jewelry finishes currently in use.

d—Primer layer 110—material is typically a plastic material such as polyvinyl dichloride, or any like material, and is typically 0.0003 inches thick. In accordance with the invention, the primer layer may be made to have many different colors by adding colorants, dyes or pigments, to the plastic primer layer. This is very significant since it enables the manufacture of colored durable cards much more cheaply than using other known techniques. The color is compounded with the primer and solvents prior to its application to the sheet or roll.

e—Adhesive layer 112—may be, for example, polyvinyl acetate (PVA or PVAC), or any like adhesive or glue-like material. The adhesive layer must be such that it enables subassembly B to be bonded to a core subassembly (e.g., A or A1); the subassembly whose components need to be protected.

6—In accordance with one embodiment, the various layers of subassembly B are bonded together in a platen press at a predetermined temperature for a predetermined time at a given pressure (e.g., 300 degrees F. at 200 psia for 10 minutes).

7—A core subassembly (e.g., A or A1) and a hard coat subassembly B are then combined together as shown in FIG. 1C or 2. The two subassemblies are then bonded (or laminated) together at a predetermined temperature for a predetermined time at a given pressure (e.g., 290 degrees F. at 200 psia for 8 minutes).

8. Alternatively, all the layers of subassemblies A and B could be bonded (sandwiched) together in a one step process if the adhesive system is designed for the application.

9. The carrier layer 104 and the release layer 106 are then removed. Note that the hard coat subassembly with the carrier and release layer removed is identified as B1 in the drawings. In one embodiment, the plastic carrier layer 104 and release layer 106 are hand stripped by a lamination operator when breaking open the completed sandwiches (assemblies). Thus is formed a durable plastic card 10 of the type shown in FIG. 1D or 2A.

10. A card 10 with the hard coat layer embodying the invention has the following properties: uniform surfaces which are scratch and abrasion resistant.

11. Laserability—A laser (e.g., a YAG laser) can be used for personalization of the resulting outside card surface. Note that a lasering operation can be performed at many different points during the manufacturing process. The lasering may be performed at or on the surface of a card assembly or two layers within the core subassembly.

11(a)—Laserability of cards which include only plastic layers—As shown in FIG. 1C, selected layers (e.g., clear PVC laminate layers 102*a*, 102*b* or in an optional PVC overlay) of a core subassembly may be formed to contain laser reactive carbon particles 901. Carbon particles and fumed silica which can be laser reactive ingredients can be formed in the printed PVC or polymer layer or in the polymer overlay. Heat from the laser (e.g., 402) causes carbon particles in these layers to char and the surrounding area turns dark. With extra power from the layer in the same spot the silica steams off its water and causes the area to turn a light color. Thus the laser is capable of making both light and dark marks on the same plastic surface.

11(b) Laserability of cards which include a metal layer—This process shows good contrast and is very secure since the hard coat layer can be ablated down to the bare surface of the underlying metal. Note the hard coat layer is either ablated if it is in direct contact with the metal surface or unaffected (if adhesive and plastic layers are attached to the metal surface) depending upon how the print and background qualities of the card affect the laser beam reflection and absorption. Sometimes, with a powerful laser the surface of the metal may also be affected causing bright bare metal to remain.

The manufacture and processing of the proposed product will result in significant cost savings over alternative methods due to a reduction of surface scratching. Card life in the field is also extended.

Figure 2A:
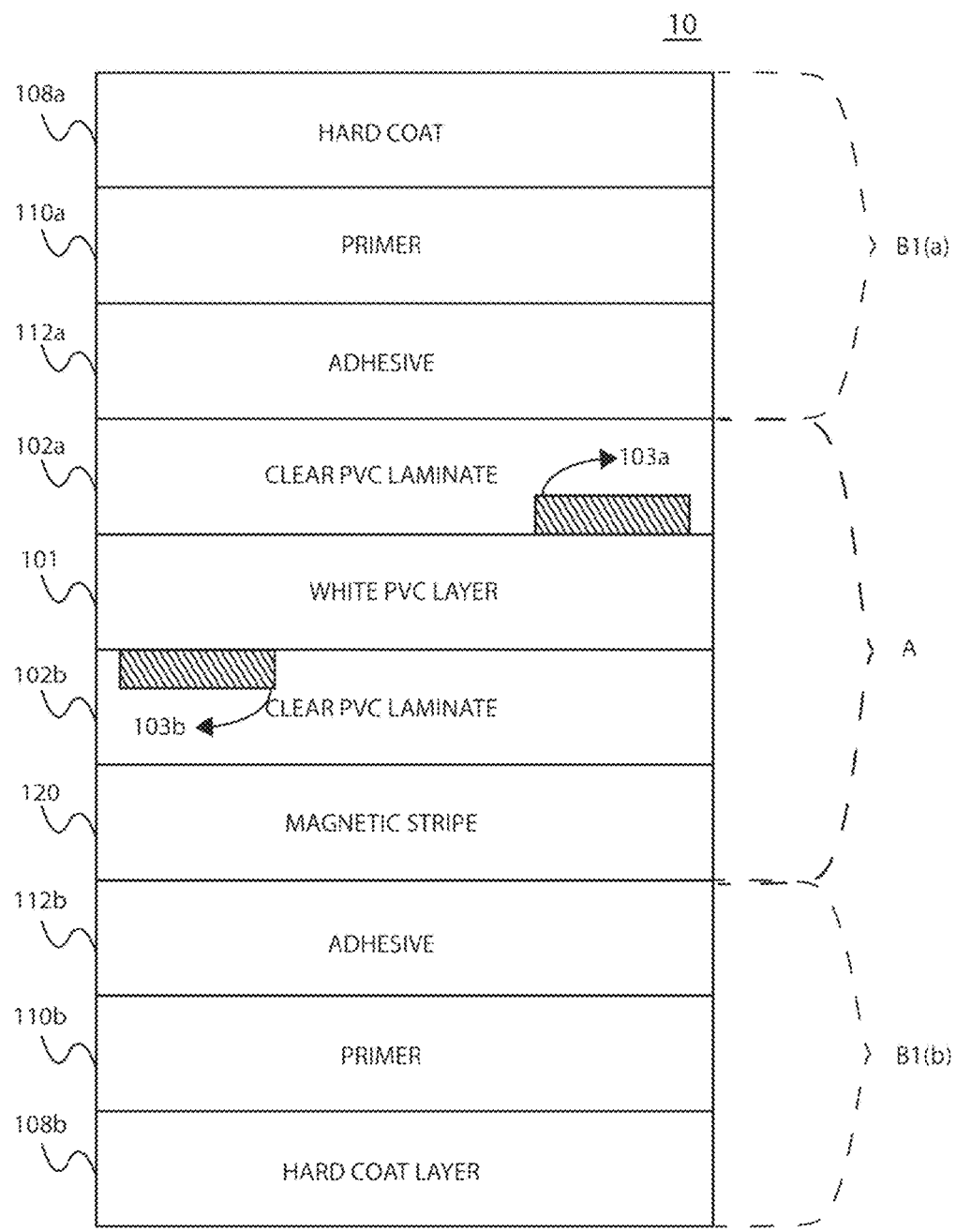
FIG. 2A is a highly simplified cross sectional diagram of a resultant durable plastic card with hard coat layers on the top and bottom side of the card in accordance with the invention.

FIGS. 2 and 2A illustrate that a hard coat layer can be formed on the top and on the bottom (both sides) of a card. FIG. 2 shows that a subassembly B, denoted as B(a), can be attached to the top side of a plastic core subassembly A and that a like subassembly B, denoted as B(b) can be attached to the bottom side of subassembly A with B(b) being the symmetrically disposed mirror image of B(a) when folded about the center core. The entire sandwich of subassemblies B(a), A and B(b) can be laminated as discussed above. After lamination, the carrier and release layers 104*a*, 106*a* and 104*b*, 106*b* are removed. This results in a card of the type shown in FIG. 2A where hard coat layers 108*a* and 108*b* are formed as the topmost and bottommost layers of the card 10. The advantage of providing a hard coat layer 108*b* over the magnetic stripe layer 120 is that it would ensure that the magnetic stripe layer would not be worn out over the useful life of the card. The hard coat can be applied only over the magnetic stripe (leaving the signature panel open) or if a full layer of had coat is applied, a laser signature can be used during personalization instead of a customer hand signed card signature.

Figure 3B:
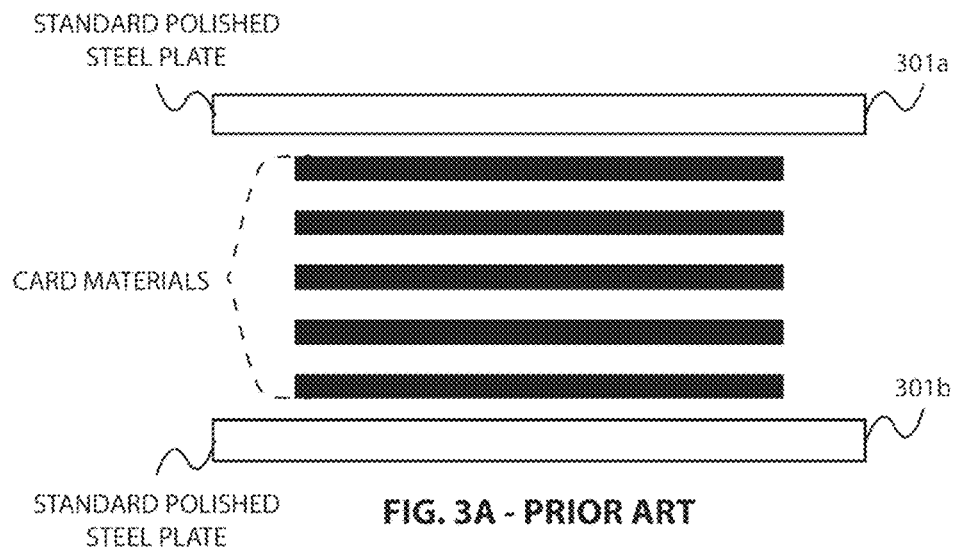
FIG. 3B is a highly simplified cross sectional diagram of platens embodying an aspect of the invention used in the manufacture of cards.
Figure 3B:
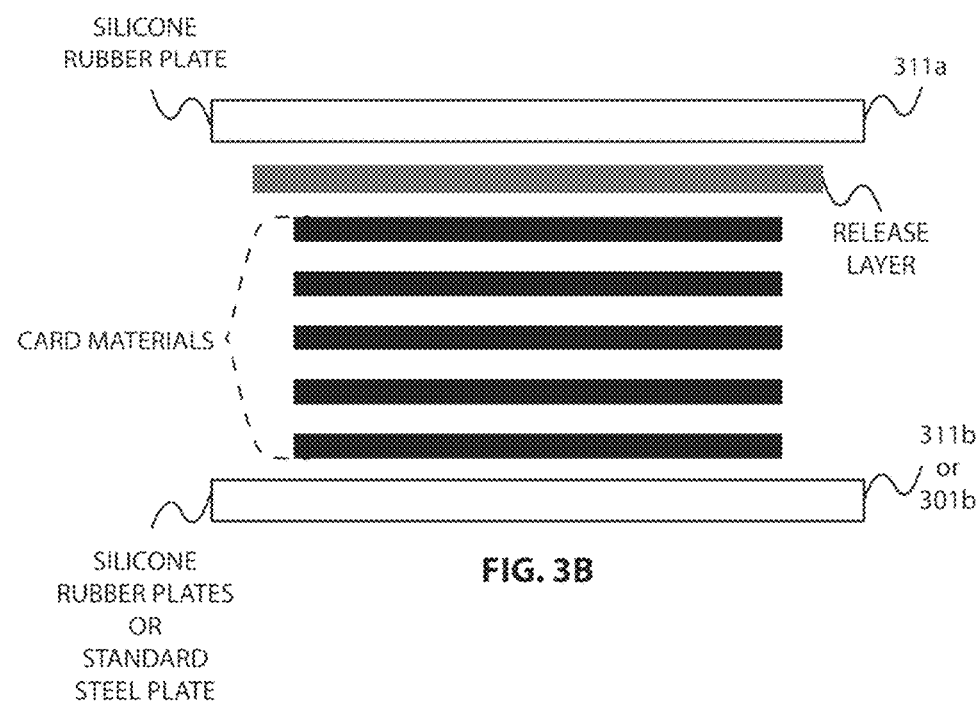

The lamination step includes the use of separate heated and cooled platens to apply pressure at a predetermined temperature to the sandwich. Prior art platens as shown in FIG. 3A include the use of standard polished steel plates (301a, 301b) heated to the desired temperature to apply the desired pressure to selected layers. A problem with the prior art platens was that air bubbles within the layers could not escape. This caused defects on the laminated sheet. This problem is overcome by replacing the polished steel plates/pads with silicone rubber plates 311a, 311b, as shown in FIG. 3B, to laminate cards embodying the invention. The use of a silicone rubber pads over the platens can provide a degree of flexibility in that it allows pressing of the hard coat into irregular areas of the sheet. This helps squeeze out air bubbles.

Furthermore, to overcome problems of manufacture and completely remove air entrapment a special vacuum lamination platen under heat and hydraulic pressure can be used with a high heat high pressure short cycle. The cards shown in the figures and formed in accordance with the invention benefit from the vacuum lamination process by completely removing air form the process.

The handling methods developed overcome lack of surface consistency by using special 30 durometer 032 to 062 thick silicone rubber.—with or without vacuum. Lamination using silicone rubber platens also can overcome lack of surface consistency by providing a more even pressure which overcomes any inconsistency in material surface and thickness.

Relative to a metal core or hybrid card using the hard coat technique allows the user to achieve a holographic, multi-dimensional effect on stainless steel or similar metal substrate with a polished or mill finish by laser engraving an image removing a physical vapor deposition (PVD) or like pigmented coating. This may be achieved by creating a pseudo lenticular lens, and changing the refractive index of the image on different layers. This may be further enhanced by creating a polarization pattern in the layers, creating a polarized light effect.

Metal Cards—

In accordance with the invention, the hard coat subassemblies may be combined with core subassemblies which include metal layers to form metal-plastic or mostly metal cards which are highly scratch resistant and even more durable.

Figure 5A:
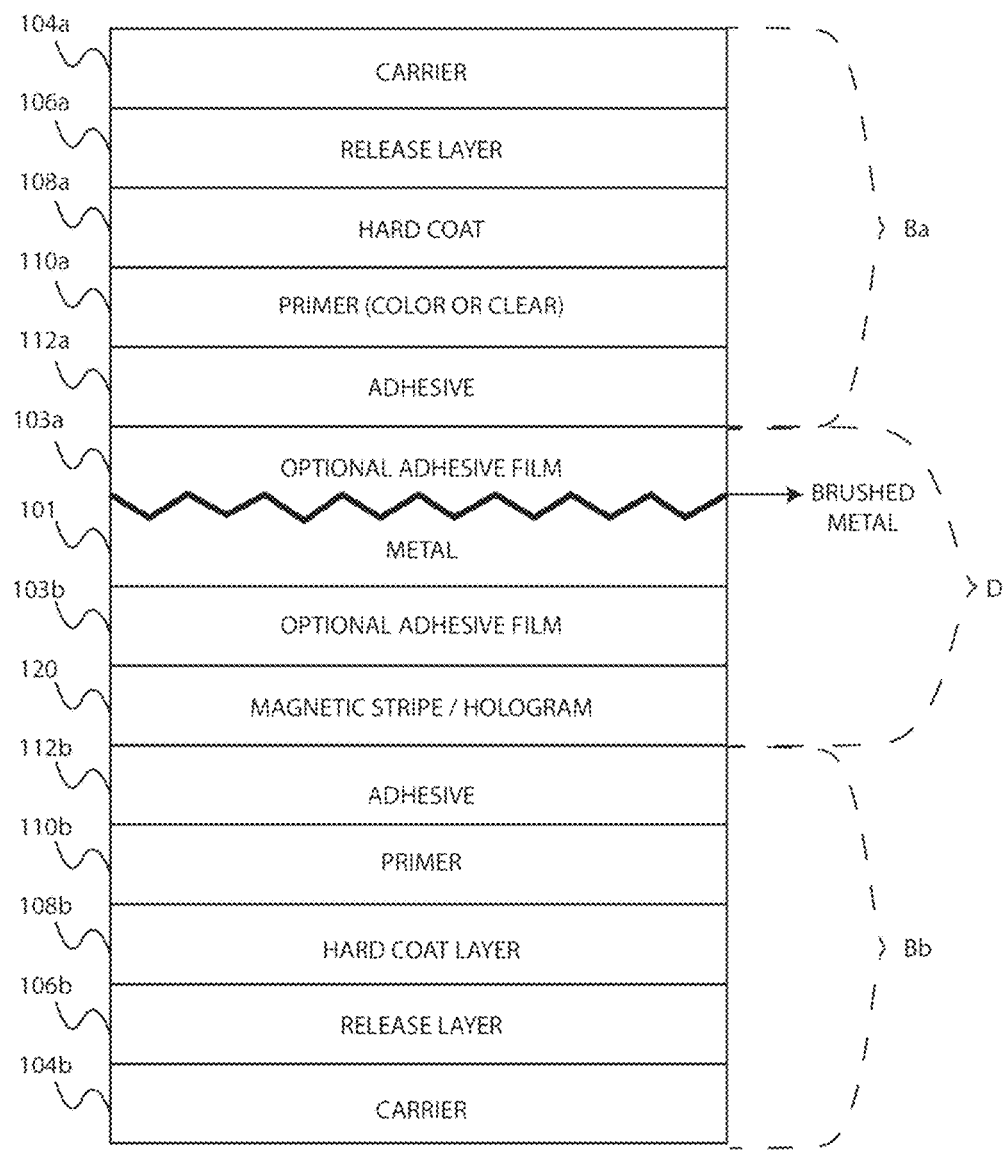
FIG. 5A is a highly simplified cross sectional diagram of a "brushed" metal card assembly for manufacturing a durable metal card in accordance with the invention.

FIGS. 4A and 5A are highly simplified cross sectional diagrams of a primarily metal card assembly for manufacturing a durable metal card in accordance with the invention. The metal layer 101 may include an optional adhesive film (103a, 103b) above it top and bottom surfaces. The optional adhesive films 103a, 103b are desirably used when the top and/or bottom surface of the metal layer 101 has been "brushed" as shown in FIG. 5A. The "brushing" may be accomplished by forming indentations in the surface of the metal layer done to give the metal layer and the resultant card a distinctive feature. The films 103a and 103b when applied to the brushed metal surfaces tend to smooth out the sharp edges and fill the depressions present on the brushed surfaces. This solves a problem when the ridges formed in the metal surfaces due to the "brushing" exceed the thickness of the hard coat layer and tend to wear through the hard coat layer. The core metal card subassembly (C in FIG. 4A, D in FIG. 5A) is shown to include a magnetic stripe and/or a hologram layer 120 on the bottom side of the metal layer.

In FIGS. 4A and 5A, the card assembly sandwich also includes a sub assembly Ba applied (sandwiched) on top of the optional adhesive film 103a and a subassembly Bb applied (sandwiched) below layer 120.

Note that the metal layer 101 may be stainless steel and have a "whitish" color. There is provided in subassemblies Ba and Bb a primer layer 110a, 110b which may be colored to give the card a desired color. Alternatively, the primer layer may be clear.

Figure 5B:
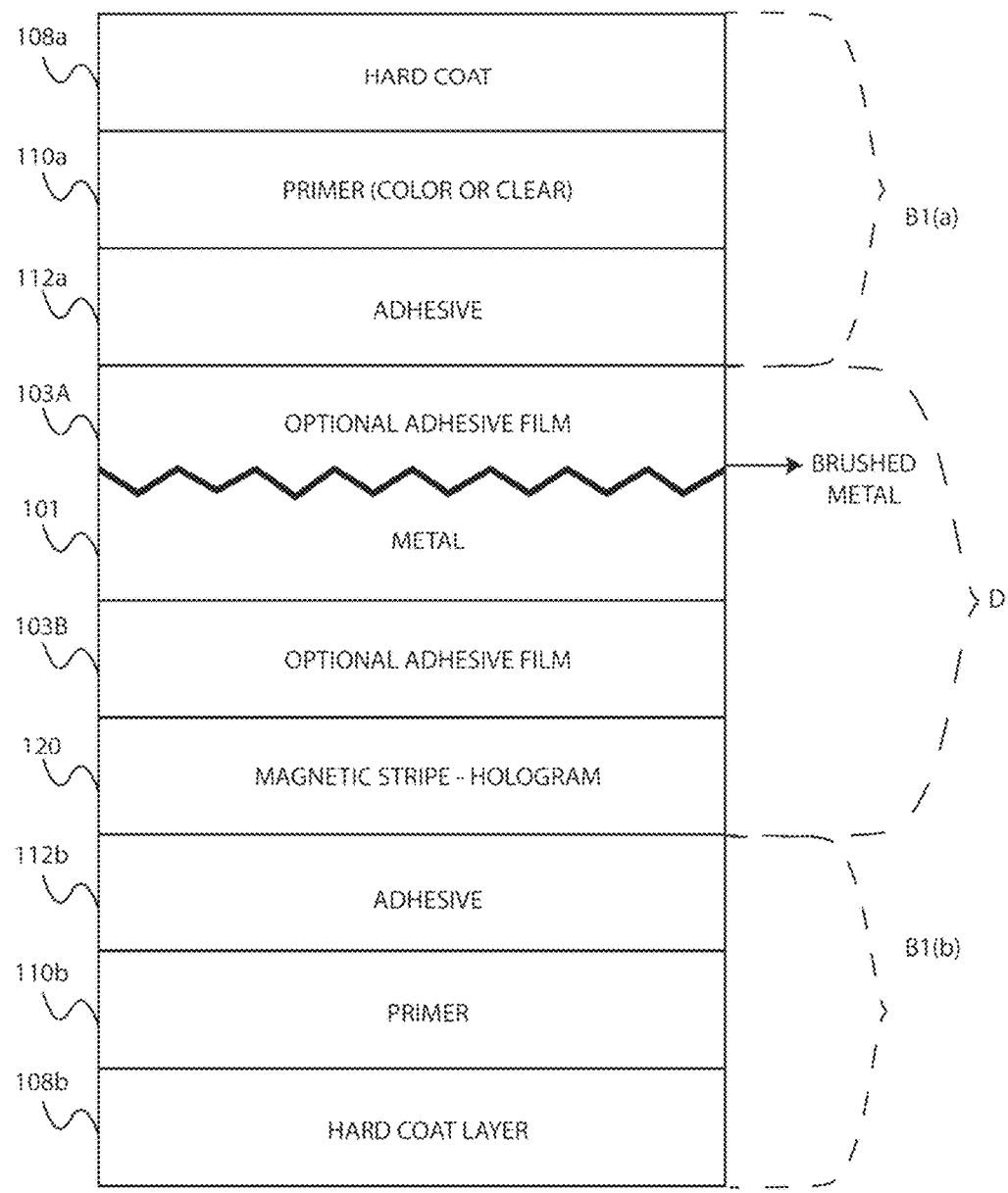
FIG. 5B is a is a highly simplified cross sectional diagram of a durable "brushed" metal card formed with a hard coat layer on the top and bottom sides of the card in accordance with the invention.

The sandwich assembly shown in FIGS. 4A and 5A is subjected to a lamination process under predetermined pressure and temperature. Thereafter, the carrier and release layers are removed leaving a resultant card of the type shown in FIG. 4B or 5B. Thus, FIGS. 4B and 5B are highly simplified cross sectional diagrams of a durable scratch resistant metal card formed with a hard coat layer on the top and bottom sides of the card in accordance with the invention. In FIGS. 4A and 5A, the thickness of the metal layer 101 may be, but need not be, nearly the full thickness of the card.

Figure 6A:
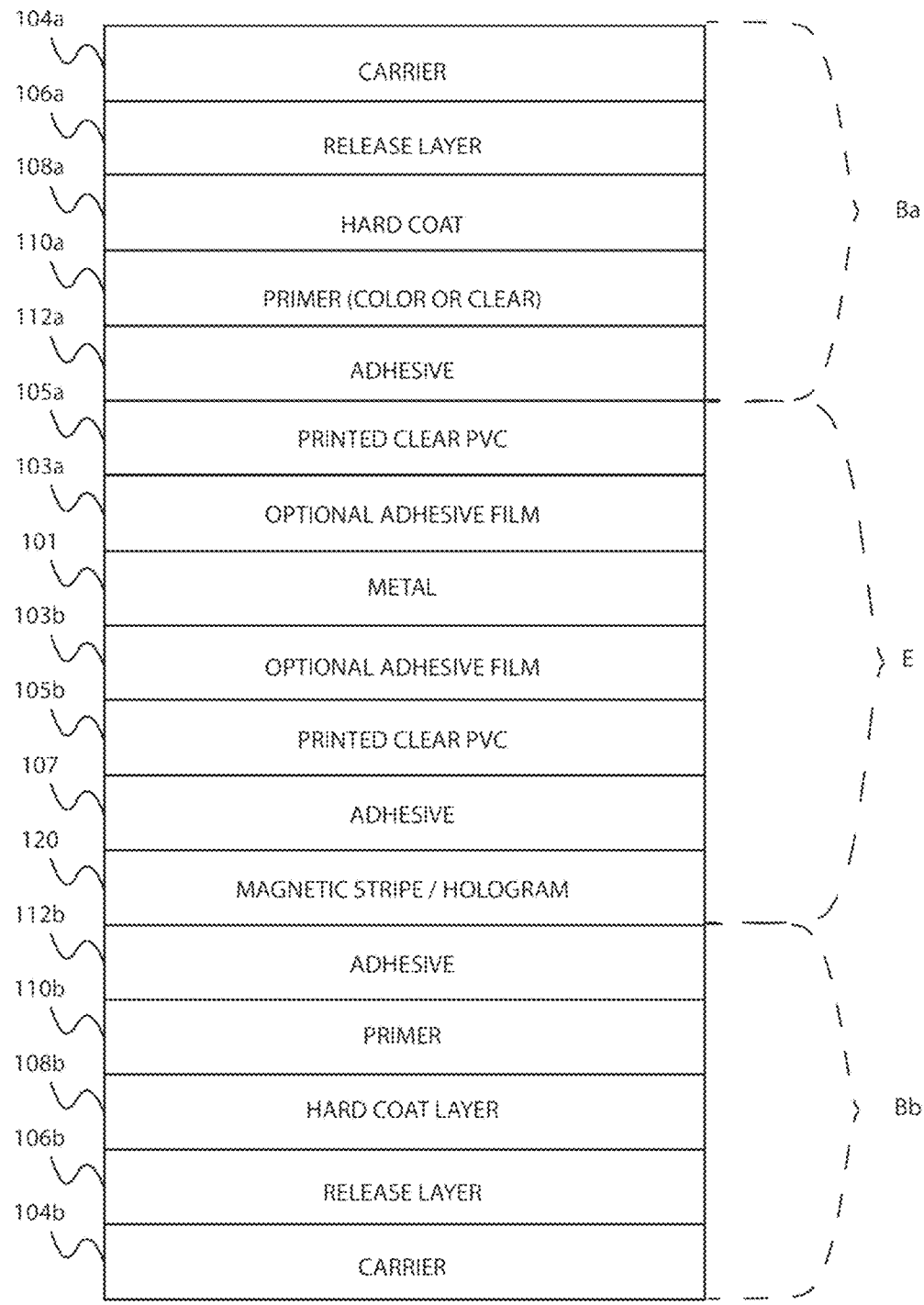
FIG. 6A is a highly simplified cross sectional diagram of an "embedded" metal card assembly for manufacturing a durable metal card in accordance with the invention.

FIG. 6A is similar to FIGS. 4A and 5A except that an additional printed clear PVC layer 105a is applied above the metal layer 101 and an additional printed clear PVC layer 105b is applied below the metal layer 101. The PVC layers 105a, 105b, enable the metal layer 101 of FIG. 6A to be made thinner than the metal layer 101 of FIGS. 4A and 5A. For example, the thickness of its metal layer may be ⅓ that of FIGS. 4A and 5A. FIG. 6A may be referred to as a durable card with an "embedded" metal layer.

Figure 6B:
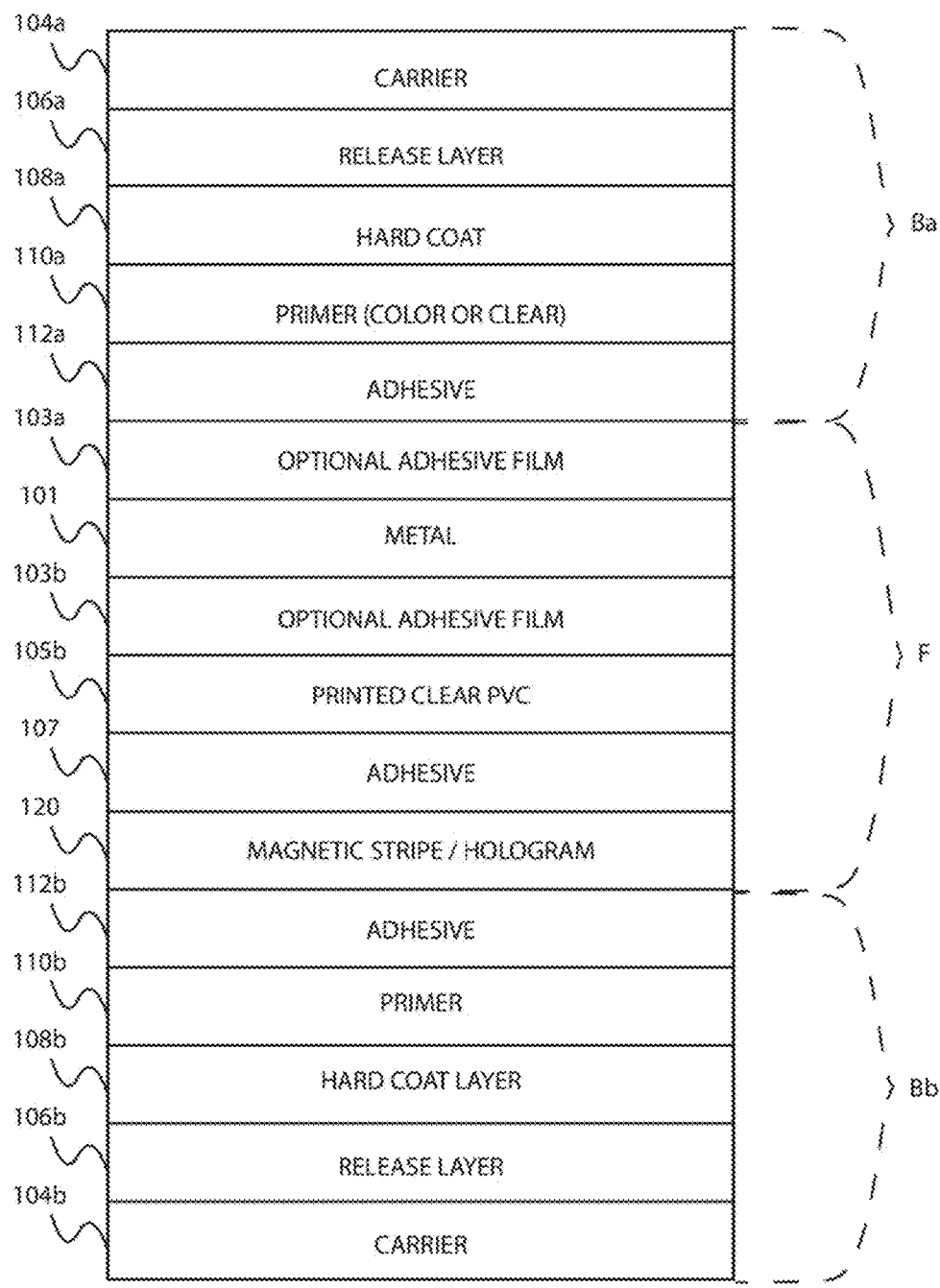
FIG. 6B is a highly simplified cross sectional diagram of a "hybrid" metal card assembly for manufacturing a durable metal card in accordance with the invention.

FIG. 6B is similar to FIG. 6A except that at least one of the PVC layers may be eliminated. The metal layer of FIG. 6B would be thicker than that of FIG. 6A but thinner than that of FIG. 4A or 5A. FIG. 6B may be referred to as a hybrid durable metal card. Note that the resultant cards formed from the assemblies shown in FIGS. 6A and 6B have a hard coat layer on their top and on the bottom surfaces.

As already discussed a "core" subassembly as used herein refers to those layers of the card which define the functionality or function to be performed by the card. A "core" subassembly may be a subassembly such as defined as subassembly A, A1, or in FIG. 4A2, C, D, E or F).

Figure 8:
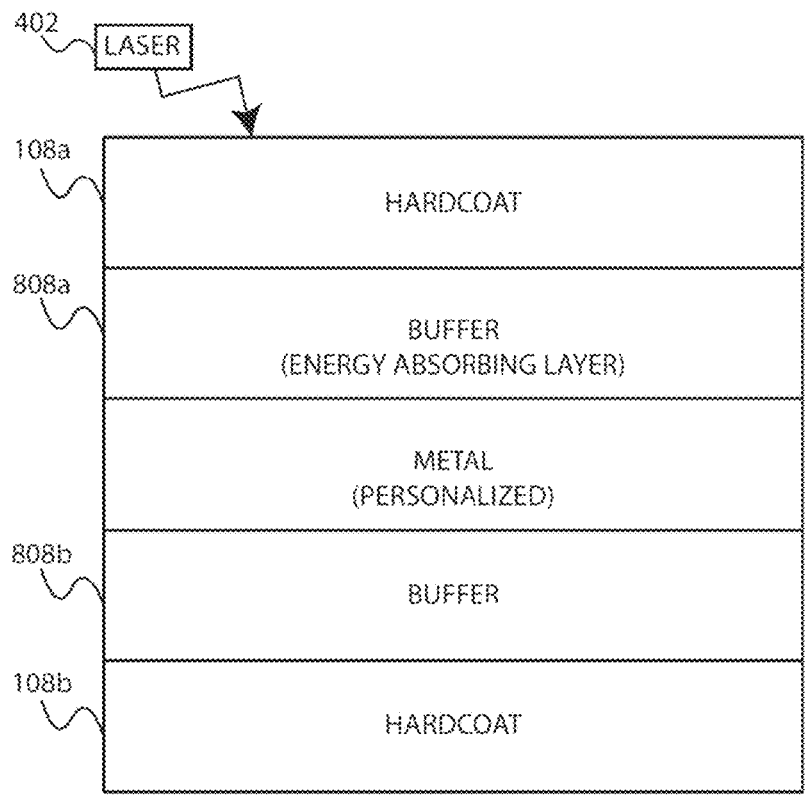
FIG. 8 is a diagram illustrating the use of an energy absorbing buffer layer between a metal layer and a hard coat layer when the metal layer is subjected to a heat generating laser beam.
Figure 9:
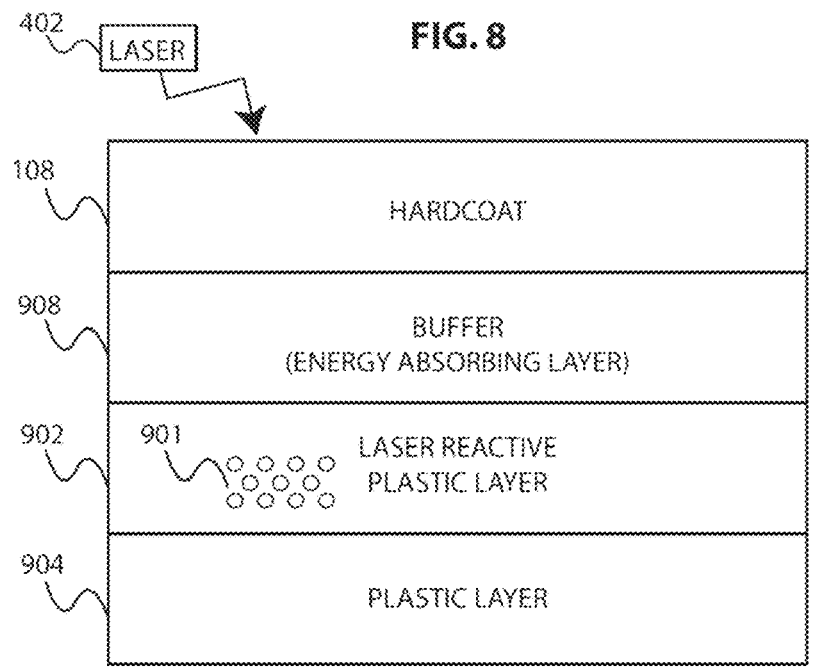
FIG. 9 is a diagram illustrating the illustrating the use of an energy absorbing buffer layer between a carbon containing PVC layer and a hard coat layer when the carbon containing layer is subjected to a heat generating laser beam.

FIGS. 8 and 9 illustrate a solution to a problem which exists when a hard coat layer is used. It is noted that a problem exists when a hard coat layer is formed so as to be in direct contact with a metal layer or a plastic layer containing laser reactive (e.g., carbon) particles and the metal layer or a plastic layer undergoes a lasering operation. When the laser is applied to the metal layer or to the laser reactive plastic layer, a substantial amount of heat (energy) is generated. When this generated heat is applied to the hard coat layer, the hard coat layer is subjected to cracking and to being effectively destroyed.

In FIG. 8 the "cracking" problem is overcome by forming an energy absorbing layer (e.g., 808a, 808b) between a metal layer (e.g., 101) and associated hard coat layers (108a, 108b). The energy absorbing layer (e.g., 808a, 808b) may be of any suitable material to absorb or dissipate the energy generated to prevent cracking of the hard coat layer. In some embodiments a primer layer 110 in addition to an adhesive layer 112 formed between the hard coat layer and the metal layer were sufficient to protect the hard coat layer from the heat generated by the laser's action. An energy absorbing buffer layer may be comprised, for example, of an extruded polymer film, and can be composed of any of the polymeric films known in the art such as PET (Polyethylene Terephthalate), PETG (Polyethylene Terephthalate Glycol), or PVC (Polyvinyl Chloride).

In FIG. 9 the "cracking" problem is overcome by forming an energy absorbing layer (e.g., 908) between a laser reactive carbon containing plastic layer (e.g., 902) and associated hard coat layers (1080. The energy absorbing layer (e.g., 908) may be of any suitable material to absorb or dissipate the energy generated to prevent cracking of the hard coat layer, as discussed above for FIG. 8.

What is claimed is:

1. A method for personalizing transaction cards, the method comprising: forming an internal core layer that includes a laser reactive layer adapted to be personalized by a laser beam, wherein the laser reactive layer is characterized by a tendency to develop heat at or above a predetermined intensity during laser personalization adjacent the points being lasered;

forming an external hard coat layer including nanoparticles selected from the group consisting of silicate nanoparticles, zinc oxide nanoparticles, and silicon dioxide crystalline nanoparticles, said hard coat layer characterized by a tendency to crack when subjected to the predetermined intensity of heat; and forming at least one buffer layer that is configured to absorb energy and heat imparted to the internal core layer by the laser beam during personalization and prevent the heat generated due to the laser beam from adversely affecting the external hard coat layer, the buffer layer being arranged between the external hard coat layer and the internal core layer; and personalizing the internal core layer of the transaction card by lasering through the external hard coat layer and the buffer layer before impacting the internal core layer at a temperature that is (i) sufficiently high to cause the laser reactive layer to react and transfer heat to the buffer layer, and (ii) below a cracking temperature of the hard coat layer, to avoid cracking the external hard coat layer.

2. The method as claimed in claim 1 wherein the laser reactive layer is a metal layer.

3. The method as claimed in claim 1 wherein the at least one buffer layer is at least one of the following: (a) polyvinyl dichloride; (b) a plastic material comprising colorants, dyes or pigments; (c) polyvinyl chloride (PVC), polyvinyl acetate (PVAC), amorphous polyethylene terephthalate (APET), or Polyethylene Terephthalate Glycol (PETG).

4. The method of claim 1, wherein personalizing the internal core layer comprises generating heat at the internal core layer in excess of the predetermined intensity of heat at which said external hard coat layer has a tendency to crack, and absorbing or dissipating with the at least one buffer layer a sufficient amount of heat to prevent cracking of the hard coat layer.

5. The method of claim 1, wherein the external hard coat layer comprises the nanoparticles dispersed within a carrier comprising a solvent of water based acrylates, vinyls or urethane.

* * * * *